(12) United States Patent
Lai (10) Patent No.: US 7,748,844 B2
(45) Date of Patent: Jul. 6, 2010

(54) HIGH VISUAL ACUITY CONTACT LENSES

(76) Inventor: Shui T. Lai, 1223 Orchard Glen Cir., Encinitas, CA (US) 92024

( * ) Notice: Subject to any disclaimer, the term of this patent is extended or adjusted under 35 U.S.C. 154(b) by 0 days.

(21) Appl. No.: 11/764,160

(22) Filed: Jun. 15, 2007

(65) Prior Publication Data

US 2007/0291224 A1    Dec. 20, 2007

Related U.S. Application Data (60) Provisional application No. 60/804,919, filed on Jun. 15, 2006.

(51) Int. Cl.
G02C 7/04 (2006.01)
(52) U.S. Cl. .................... 351/160 R; 351/177
(58) Field of Classification Search .. 351/160 R–160 H, 351/177
See application file for complete search history.

(56) References Cited

U.S. PATENT DOCUMENTS

| | | | |
|---|---|---|---|
| 3,637,416 A * | 1/1972 | Misch et al. | 428/412 |
| 3,944,347 A | 3/1976 | Barkdoll et al. | |
| 3,973,837 A * | 8/1976 | Page | 351/160 R |
| 4,166,255 A * | 8/1979 | Graham | 351/160 H |
| 5,434,630 A | 7/1995 | Bransome | |
| 5,549,632 A | 8/1996 | Lai | |
| 5,662,706 A | 9/1997 | Legerton et al. | |
| 5,895,422 A | 4/1999 | Hauber | |
| 5,984,916 A | 11/1999 | Lai | |
| 5,993,438 A | 11/1999 | Juhasz et al. | |
| 6,033,740 A | 3/2000 | Oelbrandt et al. | |
| 6,126,731 A | 10/2000 | Kemeny et al. | |
| 6,210,401 B1 | 4/2001 | Lai | |
| 6,325,792 B1 | 12/2001 | Swinger et al. | |
| 6,450,642 B1 | 9/2002 | Jethmalani et al. | |
| 6,527,716 B1 | 3/2003 | Eppstein | |
| 6,676,653 B2 | 1/2004 | Juhasz et al. | |

(Continued)

FOREIGN PATENT DOCUMENTS

EP    1630602 A2    3/2006

(Continued)

OTHER PUBLICATIONS

Notification of Transmittal of the International Search Report and the Written Opinion of the International Searching Authority, or the Declaration, in PCT Application No. PCT/US2007/071410, paper dated May 21, 2008, 11 pages.

(Continued)

*Primary Examiner*—Darryl J Collins
(74) *Attorney, Agent, or Firm*—SF Bay Area Patents, LLC; Andrew V. Smith (57) ABSTRACT

A contact lens providing high visual acuity with the comfort of a soft lens includes a thin layer of hard lens material at the front surface of the contact lens; and a second soft lens material layer at the posterior portion of the lens. The soft lens provides a contact area substantially in contact with the central region of the cornea. The first layer is bonded on top of the second layer directly or through a third elastic material layer. Manufacturing methods overcome problems of swelling of the soft lens component during hydration.

40 Claims, 4 Drawing Sheets

U.S. PATENT DOCUMENTS

| | | | |
|---|---|---|---|
| 6,706,036 | B2 | 3/2004 | Lai |
| 6,761,454 | B2 | 7/2004 | Lai et al. |
| 6,836,371 | B2 | 12/2004 | Lai et al. |
| 6,989,008 | B2 | 1/2006 | Peyman |
| 7,217,375 | B2 | 5/2007 | Lai |
| 7,220,255 | B2 | 5/2007 | Lai |
| 7,329,001 | B2 * | 2/2008 | Benrashid et al. ....... 351/160 H |
| 2003/0013339 | A1 | 1/2003 | Pan |
| 2003/0095889 | A1 | 5/2003 | Gottuso |
| 2003/0143391 | A1 | 7/2003 | Lai |
| 2004/0160576 | A1 | 8/2004 | Lai et al. |
| 2004/0243112 | A1 | 12/2004 | Bendett et al. |
| 2004/0267283 | A1 | 12/2004 | Mavor et al. |
| 2005/0259221 | A1 | 11/2005 | Marmo |
| 2007/0195264 | A1 | 8/2007 | Lai |
| 2007/0208363 | A1 | 9/2007 | Lai |
| 2007/0258046 | A1 | 11/2007 | Lai |
| 2007/0291224 | A1 | 12/2007 | Lai |
| 2008/0037135 | A1 | 2/2008 | Lai |
| 2008/0039825 | A1 | 2/2008 | Lai |
| 2008/0212024 | A1 | 9/2008 | Lai |

FOREIGN PATENT DOCUMENTS

| | | |
|---|---|---|
| WO | 02/38092 A1 | 5/2002 |
| WO | 2005/038015 A1 | 4/2005 |
| WO | 2005/062818 A2 | 7/2005 |
| WO | 2006/020605 A2 | 2/2006 |
| WO | 2007/044967 A2 | 4/2007 |
| WO | 2007/044967 A3 | 9/2007 |
| WO | 2007/147152 A3 | 12/2007 |
| WO | 2007147152 A2 | 12/2007 |
| WO | 2008/014330 A3 | 6/2008 |

OTHER PUBLICATIONS

PCT International Preliminary Report on Patentability (Chapter I of the Patent Cooperation Treaty), for PCT Application No. PCT/US2007/071410, dated Dec. 16, 2008, 7 pages.

Antonio Guirao, Ph.D. and David R. Williams, Ph.D., A Method to Predict Refractive Errors from Wave Aberration Data, Optometry and Vision Science, vol. 80, No. 1, 2003, pp. 36-42.

Jason D. Marsack, Larry N. Thibos, and Raymond A. Applegate, Metrics of optical quality derived from wave aberrations predict visual performance, Journal of Vision, vol. 4, 2004, pp. 322-328.

Xu Cheng, Arthur Bradley, and Larry N. Thibos, Predicting subjective judgment of best focus with objective image quality metrics, Journal of Vision, vol. 4, 2004, pp. 310-321.

Internet printout: Tisseel VH [Fibrin Sealant], Retrieved from URL: http://www.baxter.com/products/biopharmaceuticals/biosurgery/sub/tisseel.html.

Tisseel VH [Fibrin Sealant] product information, Retrieved from URL: http://www.baxter.com/products/biopharrmaceuticals/downloads/Tisseel_Pl.pdf.

Laser In situ Keratomileusis (Lasik), Retrieved from URL: http://www.surgeryencyclopedia.com/La-Pa/Laser-In-Situ-Keratomileusis-LASIK.html.

Laser Epitheial Keratomileusis (Lasek), Retrieved from URL: http://en.wikipedia.org/wiki/Photorefractive_keratectomy.

Conductive Kerotoplasty (CK), Retrieved from URL: http://www.allaboutvision.com/visionsurgery/ck_Itk_eye_surgery.htm.

* cited by examiner

HIGH VISUAL ACUITY CONTACT LENSES

PRIORITY

This application claims the benefit of priority to U.S. provisional patent application no. 60/804,919, filed Jun. 15, 2006, and this application is counterpart to PCT Application No. PCT/US2007/071410, filed Jun. 15, 2007, both of which are incorporated by reference.

BACKGROUND

Besides spectacle lenses, contact lenses are the next most popular vision correction device. Soft contact lenses become more popular than hard lenses due to the fact that they are more comfortable to wear, and easier to adapt to than the hard lenses, or as they are called "Rigid Gas Permeable" (RGP) lenses. One draw back of the soft lens is that the quality of vision is not as good as that provided by the hard lens, and it tends to deteriorate to less quality over time. Soft contact lens wearers compromise their visual quality for comfort.

Hard contact lenses have good structural integrity. The optical surface is well preserved throughout the wearing period. The visual acuity of a hard or rigid lens is good, when it is fitted properly; they provide crisp vision comparable to that of wearing eyeglasses. However, hard contact lenses have two big drawbacks: it is uncomfortable to wear, and hard to adapt to. It can take a new user of hard contacts up to 3-4 weeks to adapt, and to tolerate them. No hard contact lens are supposed to be used for continuous wear, i.e. wearing them to sleep in overnight. The lenses have to be removed before sleep, and soaked in disinfecting solution. Wearers of rigid lenses have to tolerate the regiments, the inconvenience and discomfort.

Therefore, it is desirable to provide a contact lens that is comfortable to wear, easy to adapt to, and provides high visual acuity vision. More desirably, a contact lens that can be wore continuously overnight and only needs to be disposed off or cleaned once a month or even longer.

Recognized by the Inventor

Soft contact lenses are made of materials that are porous. The material comprises polymer units that are flexible. The water content of soft lens is in the range of 25% to 80%. Two contributing factors that lessen the optical quality of a contact lens are: the water content on the front surface of the lens evaporates, and the water content becomes less near the lens surface than in the lens body. The porous structure at the front of the lens is no longer saturated with water and appears rough and scatters light. The second factor is that the polymer units of the flexible structure tend to migrate or re-align themselves with temperature and the blink of the eye. Therefore, the optical contour of the anterior surface of the lens deteriorates from its ideal shape when it is made.

SUMMARY OF THE INVENTION

A durable, high visual acuity contact lens is provided which has the comfort of a soft lens. The lens includes a soft contact lens component and a hard contact lens material coupled to the outer surface of the soft contact lens. The soft lens provides a contact area substantially in contact with a central region of a cornea.

A thickness of the hard material may be 20-50 microns or less. A thickness of the soft contact lens component may be 50% or less of a conventional soft contact lens, and may be 20-85 microns or less. The soft lens component may include material having a DK value of 30 or higher.

The hard material may have a diameter of 3 millimeters or more, and preferably at least covers substantially or exceeds a patient's nighttime pupil size.

The soft component and the hard material may be spun or mold casted, and the hard material may be sprayed on the front surface of the soft component.

The soft component may include silicone hydrogel or fluoro silicone hydrogel (e.g., balafilcon-A and lotrafilcon-A). The soft component may include 2-hyroxyleethyl methacrylate (HEMA) copolymers, methyl methacrylate (MMA) and N-vinyl pyrrolidone (VP), glyceryl methacralate (GlyMA), methacrylic acid (MA) or mixtures or copolymers thereof.

The lens may include an intermediate layer coupled between the soft component and the hard material. The intermediate layer may include Cellulose acetate-butyrate (CAB) and/or silicone rubber. An adhesive glue may couple the soft component and the hard material. The intermediate layer may be sprayed onto the soft component and cured, e.g., by UV light, while the hard material may be sprayed on the intermediate layer and cured.

The soft component may be swelled by hydrating with saline, freezing, and drying prior to applying the hard material to its outer surface. The freezing may be performed by a metal mold in the shape of a mold used in manufacturing the soft component.

A further contact lens is provided for high visual acuity with the comfort of a soft lens. A first layer at the front surface of the contact lens includes hard lens material, while a second layer at the posterior portion of the lens includes soft lens material. The first layer is on top of the second layer, and the first layer is bonded to the second layer directly or through a third layer including elastic material.

The thickness of the first layer may be between 2 microns and 150 microns, e.g., between 5 microns and 30 microns. A Dk value of material in the first layer may be higher than 20, e.g., higher than 90.

The thickness of the second layer may be between 50 microns and 250 microns. The Dk value of material in the second layer may be higher than 40, e.g., higher than 90.

An absorbent may be added to water content of the soft lens material. The absorbent may generate heat by absorbing a light source. Water is evaporated from the soft lens material. A soft lens polymer component is exposed to bond with the hard lens material.

A method of manufacturing a durable, high visual acuity contact lens having the comfort of a soft lens is also provided. A hard contact lens material is spun or mold casted. A soft contact lens component is spun or mold casted on the hard material. Each of the hard material and the soft component is cured, e.g., by UV light. The soft lens provides a contact area substantially in contact with a central region of a cornea.

Another method of manufacturing a durable, high visual acuity contact lens having the comfort of a soft lens is provided. A soft contact lens component is provided. A hard contact lens material is sprayed or spun or mold casted on the soft component, and cured, e.g., by UV light.

The soft component may be hydrated, frozen and dried. The drying may include transferring the soft component to a dry chamber to dehydrate and/or applying localized heating such as ay applying light with absorption depth less than 40 microns from an anterior surface of the soft contact lens component.

The method may further include forming an intermediate layer onto the soft component, curing the intermediate layer, and forming the hard material on the intermediate layer. The intermediate layer may include CAB or silicone rubber for intermediate layer material.

The method may include selecting silicone hydrogel or fluoro silicone hydrogel for soft component material and/or selecting HEMA, MMA, VP, GlyMA, MA or mixture or copolymers thereof for soft component material.

A further method of manufacturing a high visual acuity contact lens having the comfort of a soft lens is provided. A soft lens layer is made by spin casting or mold casting. The soft lens layer is hydrated. A layer of hard lens material is sprayed on the soft lens layer. The hard lens material is cured to form a bond with the soft lens layer.

The hydrated soft lens layer may be frozen. The water content of the soft lens layer may be evaporated. A cold finger may be applied on the back surface of the soft lens layer to maintain substantially most of the water content in a frozen state. The evaporating may be provided by heating from a light source that is absorbed by the water content, such that a polymer component of the soft lens layer is exposed to form a bond with the hard lens material.

The hydrating may include mixing a light absorbing additive, such as a dye, in the water for the hydrating.

BRIEF DESCRIPTION OF THE DRAWINGS

FIG. 1b schematically illustrates a front view of the lens of FIG. 1a.

FIG. 2b schematically illustrates a front view of the lens of FIG. 2a.

DETAILED DESCRIPTION OF THE EMBODIMENTS

The embodiments provide examples of a contact lens that overcomes the problems of soft contact lens, yet maintains the comfortable wear of the soft contact lens. They also provide for the high visual acuity of a hard contact lens.

Figure 1A:
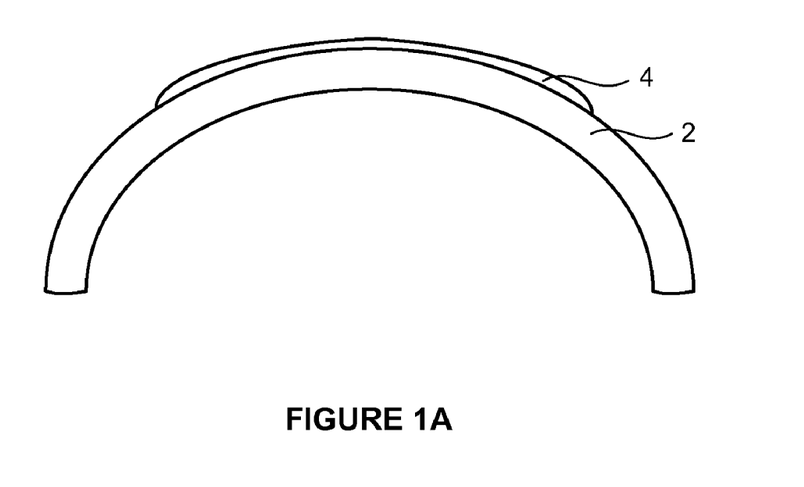
FIG. 1a schematically illustrates a side view of a high visual acuity contact lens with the feel of a soft lens in accordance with a preferred embodiment.
Figure 1B:
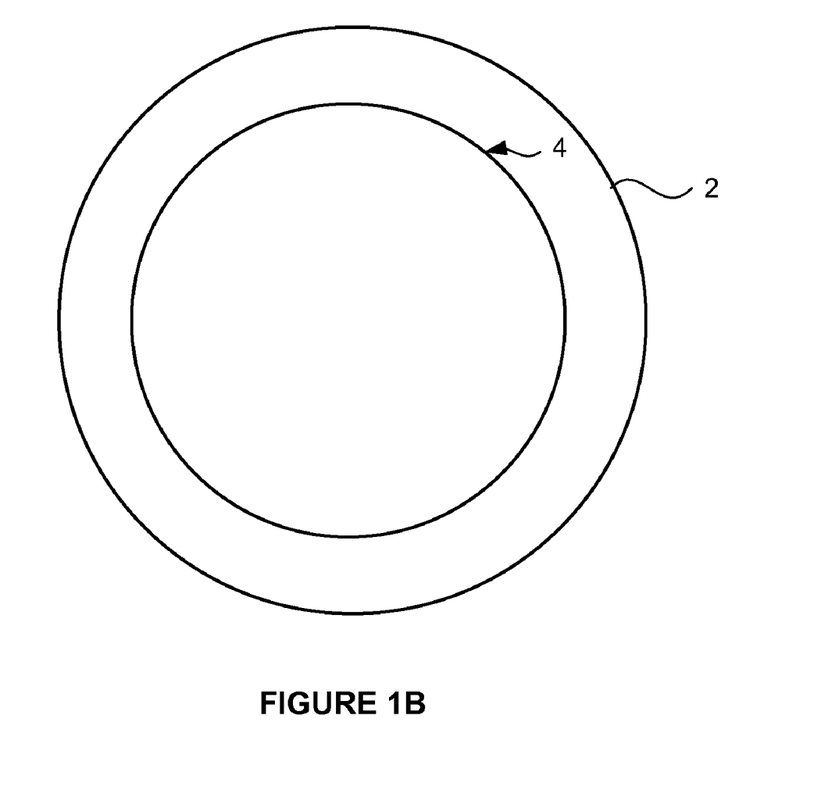

FIG. 1a-1b schematically illustrate side and front views respectively, of a high visual acuity contact lens with the feel of a soft lens in accordance with a preferred embodiment. The contact lens includes a soft contact lens 2. On the front surface of the soft contact lens 2, a thin layer of hard contact lens material 4 is formed.

The optical quality of the anterior surface of a lens is advantageously preserved, blink after blink. The material of the hard layer 4 may be chosen from host materials used in current hard contact lenses. It is preferable to use a material for the soft lens component 2 and the hard lens component 4 having high Dk values, preferably higher than 50, and in the range of 30 to 140. This high Dk value ensures good oxygen permeability. Furthermore, the hard material layer thickness is preferably in the range of 2 microns to 50 microns, it can be as thick as 100 to 150 microns, no limitation on the thickness of the hard layer is suggested here.

In an embodiment, the overall thickness of the contact lens is reduced compared to a soft contact lens. This is possible due to the hard anterior surface layer 4, because it provides for structural integrity for the handling of the lens, i.e. putting it on and off of the eye. In one embodiment, the contact lens thickness is reduced by 50%. Oxygen permeability through the lens is therefore improved. While some of the improvement may be taken up by the reduced oxygen permeability of the hard layer 4, the thickness of the hard layer 4 is made thin. An overall effect of the inventive contact lens is the sum of the hard material layer 4 and the soft lens layer 2, taking into account the thickness of each layer 2,4. A measure of oxygen transmission passing through a specific lens sample is determined by Dk/t (defined as "Oxygen Transmissibility"), where t, is the layer thickness. If in the hard layer 4, Dk is 100, and t is 20 microns, and in the soft lens layer 2 Dk is 100 and thickness of 85 microns, the overall oxygen transmissibility is actually smaller than that of an entirely soft contact lens with a total thickness of 170 microns, and a lens in accordance with certain embodiments is easier to handle than a conventional lens. Therefore, by reducing the thickness t of the hard lens layer 4, with the design parameters satisfying the requirement of preserving good optical surface structure over an intended contact wearing period of, for example, three months (or other desired wearing periods, no limitation on the wearing period is to be assumed here), an advantageous lens provides for a comfortable "soft lens" that also provides the high visual acuity of a hard lens.

The Dimension and the Location of the Hard Layer

The dimension of the hard lens area 4 is preferably at least 3 mm in diameter, covering the central area of the pupil of the patient. Typically a patient's pupil size varies from 3 mm to 7 mm. Therefore a preferred hard material portion 4 may extent from 3 mm all the way to the rim of the soft lens. There is no limitation on the dimension or the exact location of the hard surface layer 4, providing that it provides a good optical surface, and covering substantially or exceeding the patient's nighttime pupil size.

Methods of Fabricating the High Visual Acuity Contact Lens

1. Hard Material Layer First Methods

Figure 3:
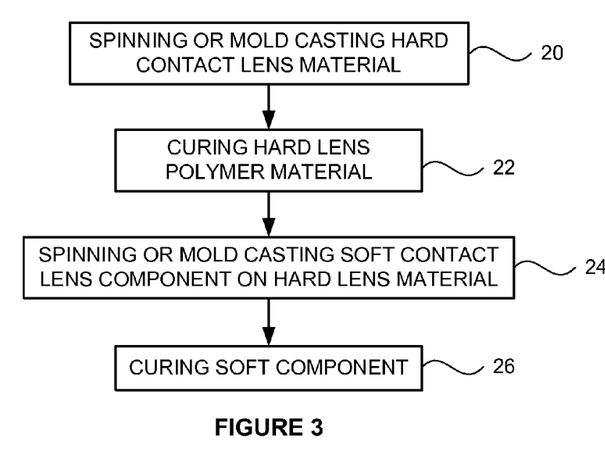
FIG. 3 is a flow chart illustrating a method of manufacturing a contact lens in accordance with a preferred embodiment.

The following methods are illustrated at FIG. 3, which includes spinning or mold casting hard contact lens material at 20, curing the hard material at 22, spinning or mold casting soft contact lens component on hard lens material 24, and curing the soft component 26.

a). Similar to a spin casting, a controlled amount of hard lens polymer is dropped into a female mold that has the intended shape of an anterior surface of the contact lens to be made. The mold is then spun to the desired speed in 20, until the material is spread to the intended diameter and material thickness. An UV light source is applied to fix the "Hard" material layer in 22. Soft lens material is then applied to the optical mold. The mold is spun a second time to form the soft layer of the contact lens 24. When the centrifugal force has spread the "soft" material to form the intended posterior surface shape of the lens, an UV source is applied to fix the shape in 26.

b). Alternatively, lens can be made using a combination of spin casting and mold casting. The steps for forming the hard material layer may remain the same as in a) above. Soft lens material is applied to the female optical mold. Instead of spinning to form the posterior surface of the lens, a second piece, a male optical mold having the intended posterior lens surface shape is applied in 24, and squeezes out any excessive soft lens material. A UV light source is then applied to fix the soft material portion of the lens in 26.

c). An alternative method is making both the hard and soft layers using the mold casting method. The hard layer is formed with a set of female and male molds designed for the thin hard lens material layer in 20. In this case the intended thickness is the thickness of the hard layer only, not for the entire contact lens. Any excess material is to be squeezed out. UV light is applied to fix the hard material layer in 22. The male mold is removed. Soft lens material is introduced into the female mold, and a third optical mold, a male mold with the correct posterior lens surface curvature, and the overall lens thickness, is applied to squeeze out any excessive soft material in 24, then cured with a UV light in 26.

Figure 4:
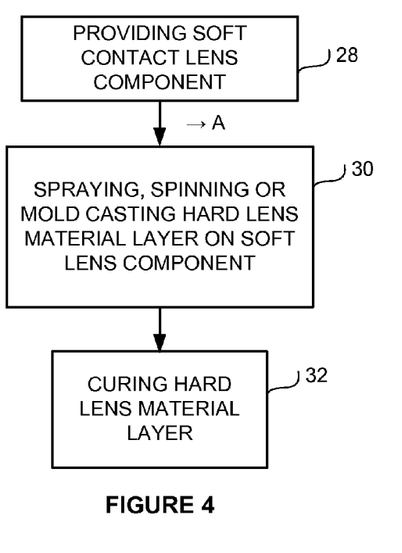
FIG. 4 is a flow chart illustrating a further contact lens manufacturing method.

2. Soft Material Layer First Methods a). A soft lens may be made using conventional methods, preferably having smaller central lens thickness as discussed as shown in 28 in FIG. 4. The hard lens polymer is fed through an atomizer jet, and the polymer is sprayed to the front surface of the soft lens to form a thin layer of material in 30. A UV light exposure to the polymer fixes the hard layer in 32.

b). Alternative to the spraying, a hard lens polymer is applied to a female optical mold. The soft lens from 2(*a*) above is introduced to the female mold in 30. A male mold having a shape of the posterior surface of the soft lens layer is applied to squeeze out any excess material hard lens polymer. The male mold also controls the overall thickness of the finished lens. Then the hard material is cured with a UV light in 32.

c). In another embodiment, the polymer in the female optical mold is spun to spread the hard lens material to a thin layer in 30. The soft lens portion is then applied to the optical mold, and the mold stops spinning and flips over upside down. The polymer diffuses into the soft lens' porous surface. A UV light is applied to fix the hard layer in 32.

Overcoming the Swell Ration of the Soft Lens Layer Saturated with Water

In accordance with another embodiment, a method is provided for overcoming the dimensional mismatch due to the expansion of the soft layer after water is absorbed. Firstly, one chooses the soft lens material having smaller expansion ratio for example, with volume swell ratio of 1.3 or less, upon its saturation with water. However, the swell ratio of soft layer is not a limiting factor.

Figure 2A:
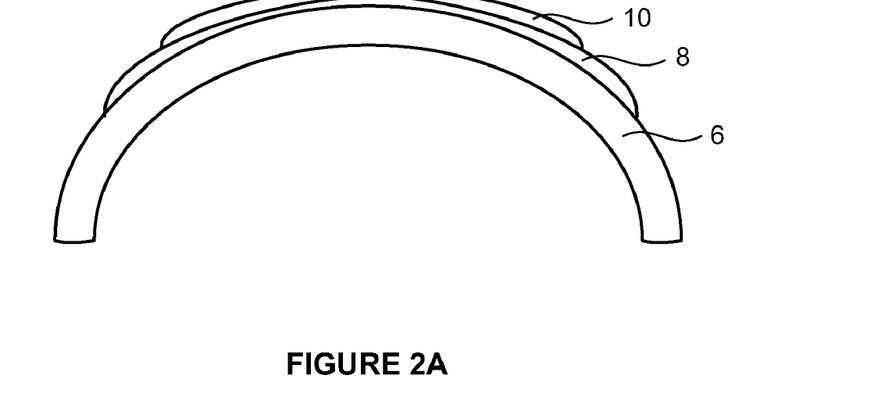
FIG. 2a schematically illustrates a side view of a high visual acuity contact lens with the feel of a soft lens in accordance with another preferred embodiment.
Figure 2B:
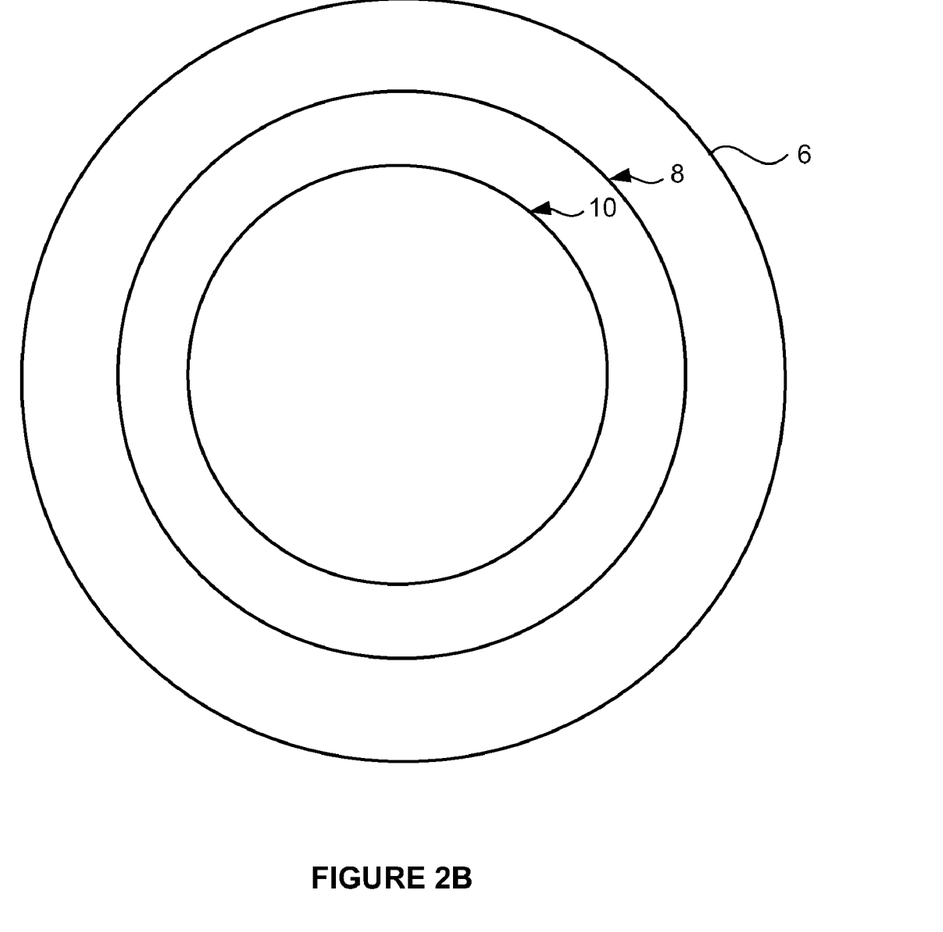
Figure 5:
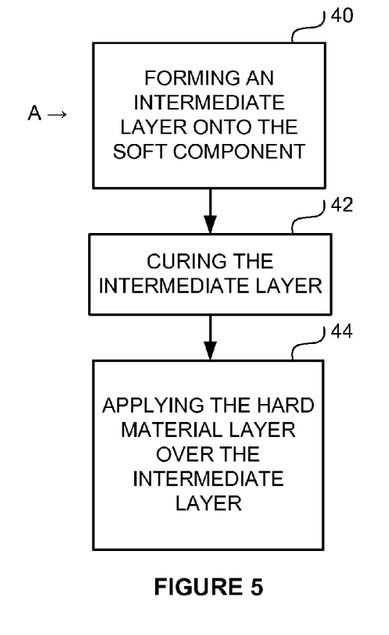
FIG. 5 is a flow chart illustrating a further contact lens manufacturing method.

In one embodiment, an intermediate polymer layer is introduced between the hard layer and the soft lens layer. In FIG. 2*a*-2*b*, a three layers contact lens structure is shown. At the posterior of the lens is a soft lens material layer 6, which has a contact area substantially covering the central region f the cornea. The intermediate layer is shown at 8 and the hard lens layer at 10. In FIG. 5, a soft contact lens is provided as shown in FIG. 4, at 28. A intermediate layer is then formed onto the soft component at 40. The intermediate layer may be formed by any one of the methods mentioned previously, including spin casting, mold casting, spraying, or any appropriate coating process. The material of this layer is cured at 42. A layer of hard lens material is applied over the intermediate layer at 44. This intermediate layer consists of a polymer similar to rubber that is easily stretchable, and forms a good bond between the hard material and the soft material.

In another embodiment, the hard lens layer is "glued" to the soft lens layer, after it expands with its water content. In this case the glue is the intermediate layer in FIG. 5. The glue material is a polymer that binds the hard material and the soft material in the presence of water content. The index of refraction of the glue is preferably closely matched with those of the hard and soft material after UV curing at 42. A hard lens material is then applied over the glue layer and cured at 44.

Figure 6:
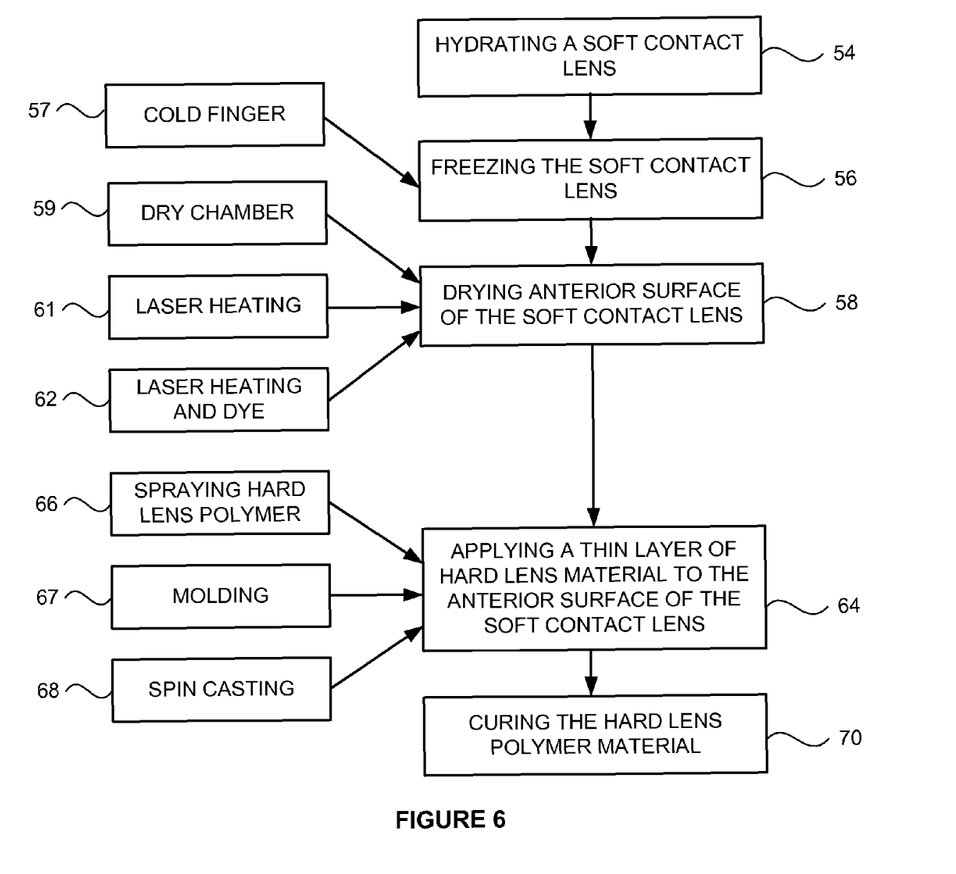
FIG. 6 is a flow chart illustrating a further contact lens manufacturing method.

In another embodiment, the soft lens portion is made by any of the methods described here or elsewhere "A" from FIG. 4, and hydrated with saline. Therefore, the soft lens layer is allowed to swell to its intended final shape. As shown in FIG. 6, the soft lens is hydrated in 54. The swelled lens is frozen in 56, and is mounted to protect the posterior surface of the lens from exposing to the atmosphere. Next, the anterior surface of the soft lens is to be dehydrated to a controlled shallow depth in 58. In one embodiment, the mounted assembly is then transferred to a dry chamber to dehydrate the front surface of the lens in 59. In another embodiment localized heating is applied to the front surface of the soft lens in 60. The localized heating can be accomplished using a light source in 61, with short absorption depth of about 5 microns. The range of the absorption depth of the light source may include 1 micron to 40 microns. Light source emitting near 1.8 to 2.0 microns wavelengths, and between 2.7 to 3.0 microns are strongly absorbed by water. Other wavelengths strongly absorbed by water can also be used. Once the water content of the first 5 to 10 microns on the lens front surface is evaporated, the hard lens material is applied in 64. The hard lens layer is preferably a thin layer. The layer may be formed by spraying in 66, molding method 67, or spin casting methods 68. UV light fixes the hard material to the soft lens in its final swelled shaped in 70. The lens is then allowed to hydrate to regain any water loss.

In another embodiment, the freezing of the soft lens in 56 further includes the use of a cold finger in 57. The posterior surface of the soft lens portion is in contact with a cold "finger", a metal mold in the shape of the male mold used in the manufacturing of the soft lens. The metal finger is kept to a sub-freezing temperature to water content in the soft lens frozen, except for the front surface that is heated by the applied light source.

In another embodiment, the water or saline used to swell the soft lens is mixed with a water soluble additive such as dye or other absorbents as shown in 62. In this method, one can select the appropriate absorbent that exhibits absorption with the light source, rather than selecting the light source that absorbs strongly in water. With this method, one can choose a more easily accessible light source, such as YAG at 1.06 microns, and Argon laser wavelengths at 5145 nm, or 4880 nm, or UV-A or UV-B bands. The absorbent component is to be removed after the bonding of the hard lens material layer.

Examples of Steps of Introducing the Intermediate Layer

What follows are examples of introducing the intermediate third layer into a lens manufacturing method. For example, in the case the hard lens material is to be sprayed on the soft lens layer, the intermediate lens material is first sprayed on the soft lens, cured, followed by spraying the hard lens material, and a UV light is applied again to cure the hard material layer. In the hard material layer first methods, the intermediate layer material can be applied to the cured hard lens layer before applying the soft lens portion to the female mold, now holding both the hard material layer and the intermediate layer.

Duration of Contact Lens Wear

There are no limitations to be inferred on the wearing period of the contact lens according to any of these embodiments. Even though it is preferable to provide a contact lens that may be worn continuously for a month or longer. An advantageous aspect of a contact lens in accordance with a preferred embodiment is the ability to comfortably wear it while providing high visual acuity. One may also envision a daily disposable lens.

Lens Material

Numerous examples of hard lens and soft lens materials are listed in "Contact Lens Practice" edited by Nathan Efron, 2002, published by Butterworth-Heinemann, Wolburn, Mass., we incorporate by reference all polymer compounds listed in that book, and the book itself in its entirety.

Examples of the Hard Lens Material

Siloxy floromethacrylate copolymers, including aquifoco, hexafocon, paflufocon-D, oprifocon-A, all have Dk value over 100 units of Barrer. Many other hard lens materials are also suitable for use in the hard lens layer of a lens in accordance with a preferred embodiment. I refer specifically to here, and incorporate by reference, the contents of chapter, pages 153-162, in the book "Contact Lens Practice" by Nathan Efron as referenced above.

Examples of the Soft Lens Material

Silicone hydrogel (balafilcon-A) and fluoro silicone hydrogel (lotrafilcon-A) are good candidates for the soft lens portion of the inventive lens. Both material has low water contents of 24-35%. However, due to the high oxygen solubility in silicone, the Dk value is made to be between 110 to 140 units in Barrer. Due to the low water content, the linear expansion of the soft lens portion is expected to be smaller, which imposes a easier requirement with the intermediate layer material for matching the hard layer material to the soft material as discussed above. Most of the hydrogel soft lens materials are candidates for our purpose. These include many forms of 2-hyroxyleethyl methacrylate (HEMA) copolymers, methyl methacrylate (MMA) and N-vinyl pyrrolidone (VP), glyceryl methacralate (GlyMA), methacrylic acid (MA), and mixtures of copolymers of any of the above polymers. I refer to here, and incorporate by reference, the contents of chapter 5, pages 71-84, in the book "Contact Lens Practice" by Nathan Efron as referenced above.

Examples of the Intermediate Layer Material

Any polymer that exhibits good elasticity and stability is a good candidate. Cellulose acetate-butyrate (CAB) and silicone rubber are among the candidates to use in the inventive devices. I refer to here, and incorporate by reference, lens material listed in the book "Contact Lens Practice" by Nathan Efron as referenced above.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, as well as U.S. patent applications Nos. 60/826,043, 60/820,340, Ser. No. 11/746,051 and Ser. No. 11/675,079, and U.S. Pat. Nos. 7,217,375, 6,761,454 and 6,836,371, also by Dr. Shui Lai, are all hereby incorporated by reference into the detailed description of the preferred embodiments as disclosing alternative embodiments and components.

I claim:

1. A durable, high visual acuity contact lens having the comfort of a soft lens, comprising:
    (a) a soft contact lens component; and
    (b) a hard contact lens material between 2 and 150 microns sprayed onto the outer surface of the soft contact lens, and
    (c) wherein a posterior surface of the soft contact lens component provides for a contact area substantially over a central region of a cornea, and
    (d) wherein the soft lens component comprises material having a DK value of 30 or higher.

2. The contact lens of claim 1, wherein a thickness of the soft contact lens component comprises 50% or less of a conventional soft contact lens.

3. The contact lens of claim 1, wherein a thickness of said soft component comprises 85 microns or less.

4. A method of providing good mechanical matching of a hard lens material and a soft lens material, comprising:
    (a) generating a soft contact lens component; and
    (b) generating a hard contact lens material coupled to the outer surface of the soft contact lens component, and
    (c) wherein a posterior surface of the soft contact lens component provides for a contact area substantially in contact with a central region of a cornea,
    (d) swelling the soft contact lens component by hydrating with a liquid;
    freezing the hydrated soft component; and
    applying the hard contact lens material to said outer surface of said soft contact lens component during a substantially frozen state of the hydrated soft component.

5. The method of claim 4, wherein the freezing comprises applying a cold metal mold in substantially the shape of a mold used in manufacturing the soft component.

6. The method of claim 4, wherein the swelling comprises mixing a light absorbing additive in the liquid.

7. A durable, high visual acuity contact lens having the comfort of a soft lens, comprising:
    (a) a soft contact lens component;
    (b) an intermediate layer sprayed onto the soft lens component; and
    (c) a hard lens component between 2 and 150 microns sprayed onto the intermediate layer, and
    (d) wherein a posterior surface of the soft contact lens component provides for a contact area substantially over a central region of a cornea, and
    (e) wherein the soft lens component comprises material having a DK value of 30 or higher.

8. A method of manufacturing a durable, high visual acuity contact lens having the comfort of a soft lens, comprising:

(a) spin or mold casting a soft contact lens component on the hard material;
(b) curing each of the hard material and the soft component;
(c) forming an intermediate layer onto the soft component;
(d) curing the intermediate layer including applying UV light; and
(e) forming the hard material on the intermediate layer.

9. A method of manufacturing a durable, high visual acuity contact lens having the comfort of a soft lens, comprising:
(a) providing a soft contact lens component;
(b) hydrating the soft contact lens component; and
(c) freezing the soft contact lens component;
(d) drying the soft contact lens component;
(e) applying a hard lens component on the soft contact lens component; and
(f) curing the hard lens component.

10. The method of claim 9, wherein the drying comprises transferring the soft component to a dry chamber to dehydrate.

11. The method of claim 9, wherein the drying comprises applying localized heating.

12. The method of claim 11, wherein the localized heating comprises applying light with absorption depth less than 40 microns from an anterior surface of the soft contact lens component.

13. The method of claim 9, further comprising heating to evaporate water content of the soft lens component, and is provided by heating from a light source that is absorbed by the water content, such that a polymer component of the soft lens layer is exposed to form a bond with the hard lens material.

14. The method of claim 9, wherein the hydrating comprises mixing a light absorbing additive in water for the hydrating.

15. The method of claim 14, wherein the light absorbing additive comprises a dye.

16. A contact lens providing high visual acuity with the comfort of a soft lens, comprising:
(a) a first layer at the front surface of the contact lens, comprising hard lens material; and
(b) a second layer at the posterior portion of the lens, comprising soft lens material, the soft lens providing a contact area substantially in contact with a central region of a cornea,
(c) wherein the first layer is on top of the second layer, and
(d) wherein the first layer is bonded to the second layer directly or through a third layer comprising elastic material bonding the first layer to the second layer, or a combination thereof
(e) wherein the lens further comprises at least one absorbent added to water content of the soft lens material, wherein the absorbent generates heat by absorbing a light source, and evaporates the water content in the soft lens material, and exposes a soft lens polymer component to bond with the hard lens material.

17. The contact lens of claim 16, wherein a thickness of the first layer is between 2 microns and 150 microns.

18. The contact lens of claim 17, wherein the first layer thickness is between 5 microns and 30 microns.

19. The contact lens of claim 16, wherein a Dk value of material in the first layer is higher than 30.

20. The contact lens of claim 19, wherein the Dk value is higher than 90.

21. The contact lens of claim 16, wherein a thickness of the second layer is between 50 microns and 250 microns.

22. The contact lens of claim 21, wherein the first layer thickness is between 5 microns and 30 microns.

23. The contact lens of claim 16, wherein a Dk value of material in the second layer is higher than 30.

24. The contact lens of claim 23, wherein the Dk value of the second layer material is higher than 90.

25. The contact lens of any of claims 1, 4, 7, 9 or 16, wherein the hard contact lens material has a diameter of 3 millimeters or more.

26. The contact lens of any of claims 1, 4, 7, 8 or 16, wherein the hard contact lens material has a diameter covering substantially or exceeding a patient's nighttime pupil size.

27. The contact lens of any of claims 1, 4, 7, 8 or 16, wherein the soft component and the hard material have been spun or mold casted, or a combination thereof.

28. The contact lens of any of claims 1, 4, 7, 8 or 16 wherein—the intermediate layer or the hard contact lens material, or both, is cured by application of UV light.

29. The contact lens of any of claims 1, 4, 7, 8 or 16 wherein the soft component comprises silicone hydrogel or fluoro silicone hydrogel, or a combination thereof.

30. The contact lens of any of claims 1, 4, 7, 8 or 16 wherein the soft component comprises HEMA, MMA, VP, GlyMA or MA, or mixtures or copolymers thereof.

31. The contact lens of any of claims 1, 4, 7, 8 or 16 wherein the hard component comprises siloxy floromethacrylate copolymers.

32. The contact lens of any of claims 1, 4, 7, 8 or 16 wherein the hard component comprises aquifoco, hexafocon, paflufocon-D, or oprifocon-A, or combinations thereof.

33. The contact lens of any of claims 1, 4, or 9, further comprising an intermediate layer coupled between the soft component and the hard material.

34. The contact lens of any of claims 1, 7 or 16 wherein the intermediate material comprises CAB or silicone rubber, or a combination thereof.

35. The method of any of claims 8 or 16, wherein at least one layer of the contact lens comprises CAB or silicone rubber.

36. The method of any of claims 8 or 16, further comprising selecting silicone hydrogel or fluoro silicone hydrogel for soft component material.

37. The method of any of claims 8 or 16, further comprising selecting HEMA, MMA, VP, GlyMA or MA or mixture or copolymers thereof for soft component material.

38. The contact lens of any of claims 4 or 9, wherein the applying comprises spraying a layer of hard lens material on the soft lens layer; and curing the hard lens material to form a bond with the soft lens layer.

39. The method of any of claims 4 or 9, further comprising applying a cold finger on the back surface of the soft lens layer to maintain substantially most of the water content in a frozen state.

40. The contact lens of claim 38, wherein the curing comprises applying UV light.

* * * * *